H. H. EDGERTON.
MANUFACTURE OF ILLUMINATING GAS FROM HYDROCARBON OILS.
No. 274,442. Patented Mar. 20, 1883.
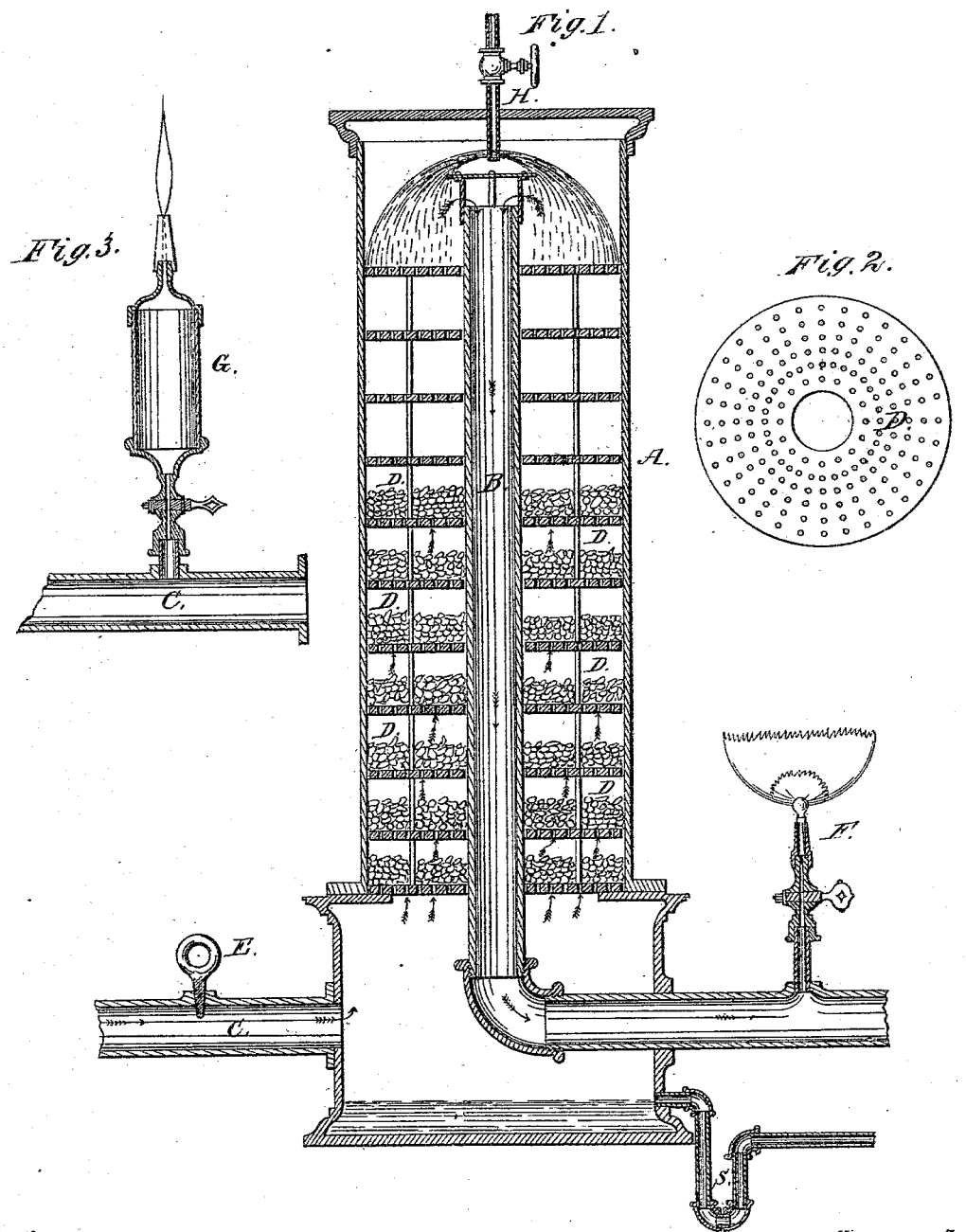

UNITED STATES PATENT OFFICE.

HENRY H. EDGERTON, OF FORT WAYNE, INDIANA.

MANUFACTURE OF ILLUMINATING-GAS FROM HYDROCARBON OILS.

SPECIFICATION forming part of Letters Patent No. 274,442, dated March 20, 1883.

Application filed May 9, 1876.

*To all whom it may concern:*

Be it known that I, HENRY H. EDGERTON, of Fort Wayne, State of Indiana, have invented certain new and useful Improvements in the Manufacture of Illuminating-Gas from Hydrocarbon Oils; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The object of this invention is the elimination of condensable matters, but more particularly smoke-producing ingredients, from gas made of petroleum or its derivatives.

One of the chief objections to the use of petroleum-gas is the throwing of smoke at the burners, even when the burners are quite small; or, if the burners are made small enough to be practically free from smoke, some of the advantages of gas-light are lost, for a small flame consumes more gas in proportion to its illuminating-power than a large one. I have made many analytical tests of oil-gas, and find that where the gas is properly made its illuminating effect resides in a large percentage of comparatively low specific gravity gases which are practically non-condensable. Also, that these practically non-condensable gases, either from the large percentage of hydrogen contained in a given volume or from their comparatively low specific gravity, have very little tendency to smoke, even in very large and brilliant flames; and from this I inferred that the smoking at the burner of petroleum-gas, as generally made and distributed, might be due to hydrocarbon vapors more dense than the non-condensable or practically non-condensable illuminants, and that such vapors might be removed by proper apparatus and methods.

The following is a full description of an apparatus and manner of using the same which will accomplish this desired result to a very striking degree, thus enabling the consumer to use larger and more economical burners with comparatively little smoke, and also to get rid of the objectionable odors often noticed in oil-gas, which I have discovered to arise entirely from practically removable vapors.

Referring to the accompanying drawings, Figure 1 represents a sectional elevation of my apparatus, of which the body A, with its screens D D D D covered with shavings or coke, or other surface-giving material, and its upper perforated screens without coke, is identical with apparatus previously used in coal-gas manufactured, generally in connection with a water jet for removing ammonia, and less frequently dry for the removal of tar by friction, chiefly for the protection of the lime-purifiers, to promote their action on the impurities in coal-gas.

The gas-inlet C and outlet B, together with the test-openings E and F—one before and one after the vessel A—are arranged as shown. The test E may be in any convenient location between the vessel A and the gas-producing surface—the test F anywhere after the vessel A, or before the gas goes to the consumer. The pipe S is used to carry off the condensation. The pipe H may be used to admit oil, in which case the operation would be substantially as described in my Letters Patent of August 15, 1871.

The apparatus G, Fig. 3, may be used, as will presently be described, to replace the test E. D, Fig. 2, is a plan of the screen D, Fig. 1. As the object of the test E is to permit the seeing of the jet, lighted or unlighted, of the generating gases, to judge of its color or condition with respect to the action of the vessel A, it may not only be varied as at G, where a glass tube allows a view of the color, as well as of an ignited jet, but I have found, among others, the following devices to accomplish less perfectly though in a degree the same object—viz, the holding of a piece of light-colored paper or surface above the test E, and afterward viewing the color and nature of the deposit, also the odor of the issuing jet, when once acquainted with the odor due to various conditions. If the gas from E be allowed to bubble through water, oil, or the like, the condition can be quite approximately determined.

Having described the apparatus, the manner of working is as follows: The preliminary conditions are to find if the gas is arriving in the vessel A in a proper state for purification from smoke ingredients. This is ascertained by the test E, and may likewise be indirectly ascertained by the test F. Overheat in the retorts or too slow admission of oil or vapor thereto would soon fill the screens and cover the surface of the contents of the vessel A with fine carbons, besides impairing the illuminating-power. This condition is readily observed at E through the color of the gas issuing in a stream, which would be black with fine carbon particles, or dark snuff-brown, unless, indeed, the carbon should be mechanically sifted out or arrested before arriving at E. The odor would be very raw and irritating. The remedy is the lowering of the heat by proper dampers or firing, or more effectually and rapidly by the admission of more oil or vapor. The proper color of the gas to enable the vessel A to operate is a dense bluish-white tobacco-smoke color, and as the color approaches a light transparent blue the capability of A to remove the smoke-producing ingredients will become impaired, chiefly on account of the greater quantity of such smoke-producing vapors, and secondarily on account of less heavy condensation for their solution and removal. Again, as these conditions change, the odor becomes less irritating, and finally assumes very nearly that of gasoline vapor. I have thus described the most perfect and ready means for testing the necessary conditions, which are, first, that fine carbon must not be present to choke up the contents of A or, second, that smoky vapors shall not be present in such unnecessary and wasteful proportions that the contents of A cannot retain, deposit, or dissolve them all. The object of burner F is to ascertain if the operation of removing the vapors has been sufficient or continuous, and for that purpose a burner somewhat larger than that furnished the consumer is most effectual, though one of the same size will answer, with due allowance, or a straight scaled jet similar to a jet-photometer may be used, provided no oil surface is presented between the passing gas in B and the burning jet. A smoky flame at F will indicate improper conditions at E or insufficiency of surface or work in A, and in extreme cases an actual insufficiency of heavy high boiling-point condensation, to absorb or retain all or a sufficient amount of smoke-producing vapors.

As a single-burner flame of the gas exceeding from fourteen to twenty candles is seldom demanded, and as that seems to be the quantity of light most agreeable at present, both by habit and adaptation of fixtures, to the consumer, it has been my object to adapt the apparatus to those conditions, and the surface of the vessel A or the number of vessels A must be increased to suit the make of gas to attain this object, or the valve H opened and dense oils sprayed into the vessel A, thus increasing its capacity; but on this point reference should be had more particularly to the apparatus patented by me August 15, 1871.

Having described the construction and operation of my apparatus, I desire to point out what is therein new of my invention and to disclaim that which is old.

It is known that the vessel A, with its contents, substantially as shown, has been used in gas-manufacture. First, by supplying a water-jet at H it becomes the well-known scrubber for removing ammonia and tar; second, by discontinuing the water at H it has been sometimes used as a dry or friction condenser, when its action is generally regulated to prevent the soiling of the lime in the purifiers, and thus curtailing its action. Its use in this latter manner has a tendency to remove vapors useful to illumination in coal-gas, and is condemned by the best authorities, unless, indeed, it be employed at a temperature which prevents such solution. These vapors, which in oil-gas will produce smoke, in coal-gas produce light, and herein lies the difference in operating the vessel A, that it is conducted particularly with reference to the removal of smoke-producing ingredients.

Having now fully described my said invention and the manner of carrying the same into effect, what I claim, and desire to secure by Letters Patent, is—

1. The method of making gas from hydrocarbon by admitting the hydrocarbon into a hot retort or in contact with a gas-generating surface, and regulating the temperature in the retort and the feed of the hydrocarbon, as described, to secure the desired conditions, which are indicated by a dense bluish-white tobacco-smoke color in the crude gas before the carbon becomes sifted out, or by an equivalent test, as set forth.

2. The method described of making gas from hydrocarbon and preventing the clogging of the apparatus by admitting the hydrocarbon into a hot retort or in contact with a gas-generating surface, testing the crude gas for free carbon and for heavy condensable vapors and increasing the feed of hydrocarbon when free carbon in excess is indicated, and diminishing the feed when the heavy condensable vapors appear in excess, substantially as described.

3. The method of testing gas in process of generation by allowing a jet of the crude gas to impinge upon a sheet of paper or other surface, substantially as described, the deposit formed being indicative of the operations going on in the retort or at the gas-generating surface, as set forth.

4. The method described of making and purifying gas from hydrocarbon by regulating the temperature of the retort or gas-generating surface and the feed of the hydrocarbon according to the quantities of free carbon and condensable vapors contained therein, as ascertained by the described tests, and then passing the gas through a friction-scrubber, substantially as described.

In testimony that I claim the foregoing as my own I affix my signature in presence of two witnesses.

HENRY H. EDGERTON.

Witnesses:
GEO. T. FOWLER,
C. R. EDGERTON.